United States Patent
Akiyama et al.

(10) Patent No.: US 10,767,088 B2
(45) Date of Patent: Sep. 8, 2020

(54) PHOTOREVERSIBLE ADHESIVE AGENT

(71) Applicant: National Institute of Advanced Industrial Science and Technology, Tokyo (JP)

(72) Inventors: Haruhisa Akiyama, Tsukuba (JP); Hideyuki Kihara, Tsukuba (JP); Aishi Yamashita, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 108 days.

(21) Appl. No.: 16/068,570

(22) PCT Filed: Jan. 4, 2017

(86) PCT No.: PCT/JP2017/000020
§ 371 (c)(1),
(2) Date: Jul. 6, 2018

(87) PCT Pub. No.: WO2017/119412
PCT Pub. Date: Jul. 13, 2017

(65) Prior Publication Data
US 2019/0016933 A1    Jan. 17, 2019

(30) Foreign Application Priority Data
Jan. 7, 2016 (JP) ................................. 2016-001777

(51) Int. Cl.
*C09J 153/00* (2006.01)
*C08F 293/00* (2006.01)
(Continued)

(52) U.S. Cl.
CPC ............ *C09J 153/00* (2013.01); *B32B 38/10* (2013.01); *B32B 43/006* (2013.01);
(Continued)

(58) Field of Classification Search
CPC ...... C08F 293/00; C09J 153/00; C09J 133/14; C09J 201/06; C09J 133/04; C09J 133/08;
(Continued)

(56) References Cited

U.S. PATENT DOCUMENTS

2015/0159058 A1*  6/2015 Akiyama ............... C09J 133/14
156/247

FOREIGN PATENT DOCUMENTS

| CN | 103642448 A * 3/2014 |
| JP | 2011256291 A * 12/2011 |

(Continued)

OTHER PUBLICATIONS

English language abstract for CN103642448, Mar. 2014.*
(Continued)

*Primary Examiner* — Philip C Tucker
*Assistant Examiner* — Jimmy R Smith, Jr.
(74) *Attorney, Agent, or Firm* — Lucas & Mercanti, LLP

(57) ABSTRACT

When conventional photo-reactive compounds are to be liquefied with the application of light, liquefaction thereof is time-consuming due to poor sensitivity to ultraviolet light. In the case of conventional photo-reactive compounds, disadvantageously, light does not penetrate through layers to be adhered to each other when such layers are thick. Thus, peeling is not sufficiently performed. Accordingly, it is an object of the present invention to overcome such drawbacks of conventional photo-reactive compounds and provide a photo-reactive adhesive agent exhibiting high sensitivity to light for fluidization and capable of easy peeling. This invention provides a photo-reactive pressure-sensitive adhesive agent comprising, as a main component, a polymeric compound with a weight average molecular weight of 3,000 to 800,000 represented by General Formula (1):

(Continued)

wherein A represents a block polymer of monomers represented by Formula (2) below with a molecular weight of 1,000 to 100,000; and B represents a block polymer with a molecular weight of 1,000 to 400,000 having a glass transition point and a melting point of 20° C. or lower, which is liquid or plastically deformable at room temperature, provided that B does not absorb light of a wavelength range of 350 to 600 nm by itself:

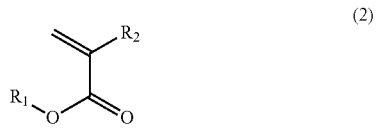

(2)

wherein $R_1$ represents a group having an azobenzene structure represented by Formula (3) below; n is an integer of 2 to 18; m is an integer of 0 to 16; and $R_2$ represents hydrogen or a methyl group.

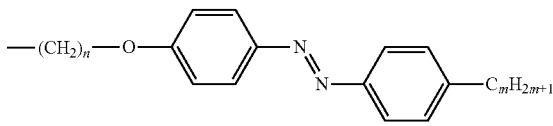

(3)

10 Claims, 2 Drawing Sheets

(51) Int. Cl.
    B32B 38/10      (2006.01)
    B32B 43/00      (2006.01)
    C09J 107/00     (2006.01)
    C09J 133/04     (2006.01)
(52) U.S. Cl.
    CPC .... C08F 293/00 (2013.01); *B32B 2310/0806* (2013.01); *B32B 2310/0831* (2013.01); *C09J 107/00* (2013.01); *C09J 133/04* (2013.01)
(58) Field of Classification Search
    CPC ...... C09J 133/10; C09J 133/12; C09J 107/00; C09J 109/00; C09J 113/00; C09J 115/00; C09J 119/00; C09J 121/00; B32B 43/006; B32B 2310/0806; B32B 2310/0831; B32B 2310/08; B32B 38/10
    USPC ........................................................ 156/247
    See application file for complete search history.

(56)              References Cited

FOREIGN PATENT DOCUMENTS

JP           5360794 B2      12/2013
    JP           5561728 B2       7/2014
    WO        2013/168712 A1     11/2013

OTHER PUBLICATIONS

Haruhisa Akiyama et al., "Photochemically Reversible Liquefaction and Solidification of Single Compounds Based on a Sugar Alcohol Scaffold with Multi Azo-Arms", Advanced Materials, 2012, vol. 24, pp. 2353-2356.
Haruhisa Akiyama et al., "Photochemically Reversible Liquefaction and Solidification of Multiazobenzene Sugar-Alcohol Derivatives and Application to Reworkable Adhesives", Applied Materials & Interfaces, 2014, vol. 6, pp. 7933-7941.

* cited by examiner

PHOTOREVERSIBLE ADHESIVE AGENT

CROSS-REFERENCE TO RELATED APPLICATIONS

This application is a 371 of PCT/JP2017/000020, filed Jan. 4, 2017, which claims benefit of Japanese Patent Application No. 2016-001777 filed on Jan. 7, 2016.

TECHNICAL FIELD

The present invention relates to a photo-reactive adhesive agent that can repeat photoreversible adhesion and peeling with an improved response rate and film-forming performance.

BACKGROUND ART

As a method for reversible fluidization and non-fluidization of a material via application of light, a method in which ultraviolet light and visible light are applied to a liquid crystalline azobenzene compound having a sugar alcohol skeleton (see Patent Literature 1) is known (Patent Literature 2 and Non Patent Literatures 1 and 2). Such reversible fluidization and non-fluidization is realized because the azobenzene structure has photo-reactivity, leading to photo-induced phase transition. FIG. 1 shows photographs showing the conditions of fluidization and non-fluidization of a compound by such method. As shown in FIG. 1, the azobenzene compound in a powdery solid state (the left photograph) is irradiated with ultraviolet light, the compound is liquefied to form a spherical drop (the middle photograph), the drop is irradiated with visible light, a solid that retains a spherical form even if lifted with a spoon is formed as shown in the photograph (the right photograph), the solid is irradiated with ultraviolet light again, and the solid then resumes the form of a spherical drop (the middle photograph).

For application in such method for non-fluidization and fluidization of a compound, an adhesive agent capable of reversible adhesion and peeling with the application of light has been proposed. When a conventional adhesive agent was used, it was difficult to detach the adhered objects from each other without a thermal or mechanical impact, and it was also difficult to use or adhere the detached objects again. Such problems can be overcome with the use of a material that is capable of repeating reversible adhesion and peeling with the application of light. In addition, an azobenzene compound in the form of a polymer comprising an azobenzene structure in its side chain is known to remain capable of reversible fluidization and non-fluidization with the application of light, as with the case of the low-molecular-weight azobenzene compound described in, for example, Patent Literature 1 and gain an increased adhesion force at the time of adhesion (Patent Literature 3).

CITATION LIST

Patent Literature

Patent Literature 1: JP 5,360,794 B, "Sugar alcohol ester or ether, cholesteric liquid crystal additive, liquid crystal composition, and liquid crystal display element," Sep. 13, 2013
Patent Literature 2: JP 5,561,728 B, "Method for fluidization and non-fluidization of compound with light," Jun. 20, 2014
Patent Literature 3: WO 2013/168712, "Photo-reactive adhesive agent"

Non Patent Literature

Non Patent Literature 1: Advanced Materials, 24, 2353-2356, 2012
Non Patent Literature 2: ACS Appl. Mater. Interfaces, 6, 7933-7941, 2014

SUMMARY OF INVENTION

Technical Problem

When conventional photo-reactive compounds are to be liquefied with the application of light, liquefaction thereof is time-consuming due to poor sensitivity to ultraviolet light. In the case of conventional photo-reactive compounds, disadvantageously, light does not penetrate through layers to be adhered to each other when such layers are thick. Thus, the layers adhered to each other are not sufficiently detached from each other. Accordingly, it is an object of the present invention to overcome such drawbacks of conventional photo-reactive compounds and provide a photo-reactive adhesive agent exhibiting high sensitivity to light for fluidization and capable of easy peeling.

Solution to Problem

The present inventors have conducted concentrated studies in order to attain the above objects. As a result, they discovered that a photo-reactive adhesive agent (preferably a photo-reactive pressure-sensitive adhesive agent) that can be liquefied and peeled faster than conventional adhesive agents with the application of light and can be reversibly re-adhered to a substrate could be obtained with the use of a synthetic block copolymer composed of a component of a polymeric liquid crystalline compound comprising a photo-reactive group as a site indicating photo-induced phase transition separately from a polymeric component that is a light permeable, is not photo-reactive, and is flexible with a glass transition point and a melting point equivalent to or lower than room temperature. This has led to the completion of the present invention.

With the use of a flexible polymer having no photo-reactivity and exhibiting a glass transition point and a melting point equivalent to or lower than room temperature for such block copolymer, the resulting adhesive layer can have rubbery elasticity. Thus, stress concentration can be loosened, and the resulting adhesive agent can be tolerant to peeling.

The present invention has been completed based on the finding described above. The present invention provides the following.

[1] A photo-reactive pressure-sensitive adhesive agent comprising, as a main component, a polymeric compound with a weight average molecular weight of 3,000 to 800,000 represented by General Formula (1):

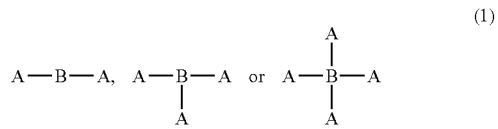

wherein A represents a block polymer of monomers represented by Formula (2) below with a molecular weight of 1,000 to 100,000; and B represents a block polymer with a molecular weight of 1,000 to 400,000 having a glass transition point and a melting point of 20° C. or lower, which is liquid or plastically deformable at room temperature, provided that B does not absorb light of a wavelength range of 350 to 600 nm by itself:

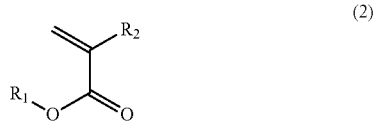
(2)

wherein $R_1$ represents a group having an azobenzene structure represented by Formula (3) below; n is an integer of 2 to 18; m is an integer of 0 to 16; and $R_2$ represents hydrogen or a methyl group.

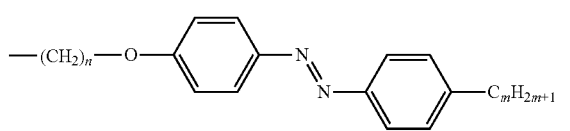
(3)

[2] The photo-reactive pressure-sensitive adhesive agent according to [1], which can be fluidized and peeled with the application of light.
[3] The photo-reactive pressure-sensitive adhesive agent according to [2], which is fluidized and peeled with the application of ultraviolet light in the wavelength range of 350 to 390 nm at the light exposure dose of 0.05 to 10 $J/cm^2$.
[4] The photo-reactive pressure-sensitive adhesive agent according to any of [1] to [3], which can be non-fluidized with the application of light in a wavelength range different from that of the light used for fluidization to adhere objects to each other.
[5] The photo-reactive pressure-sensitive adhesive agent according to [4], which is non-fluidized with the application of light in the wavelength range of 420 to 600 nm.
[6] The photo-reactive pressure-sensitive adhesive agent according to any of [1] to [5], which can repeat adhesion and peeling via reversible non-fluidization and fluidization with the application of lights in different wavelength ranges.

This description includes part or all of the content as disclosed in the description and/or drawings of Japanese Patent Application No. 2016-001777, which is a priority document of the present application.

Advantageous Effects of Invention

According to the present invention, the photo-reactive pressure-sensitive adhesive agent that is capable of adhesion and peeling with the application of light can have enhanced light sensitivity when the adhesive agent is to be peeled.

DESCRIPTION OF EMBODIMENTS

Figure 1:
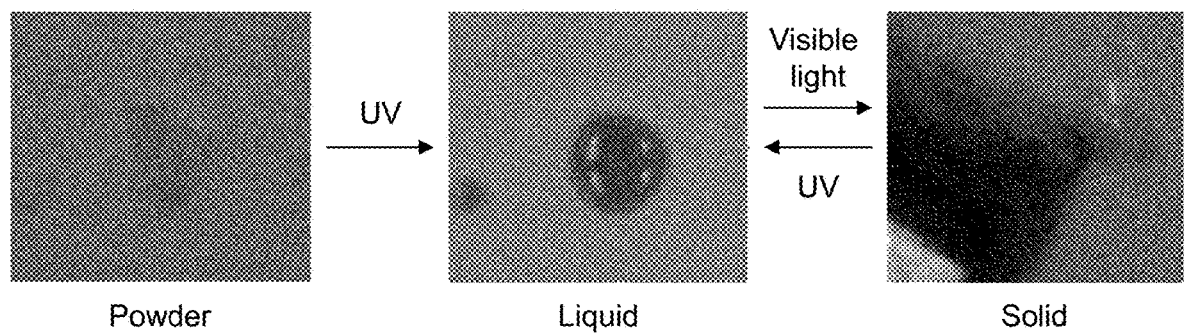
FIG. 1 shows photographs demonstrating that a liquid crystalline azobenzene compound having a sugar alcohol skeleton is liquefied and solidified in response to the application of light.

The photo-reactive pressure-sensitive adhesive agent according to the present invention comprises, as a main component, an azobenzene-containing polymeric compound with a weight average molecular weight of 3,000 to 800,000 represented by General Formula (1) below, which is non-fluidized and fluidized with the application of light and becomes capable of reversible adhesion of objects and peeling thereof:

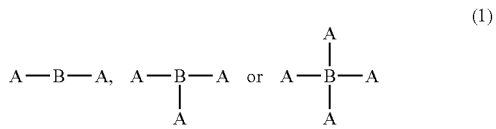
(1)

wherein A represents a block polymer of monomers represented by Formula (2) below with a molecular weight of 1,000 to 100,000; and B represents a block polymer with a molecular weight of 1,000 to 400,000 having a glass transition point and a melting point of 20° C. or lower, which is liquid or plastically deformable at room temperature, provided that B does not absorb light of a wavelength range of 350 to 600 nm by itself:

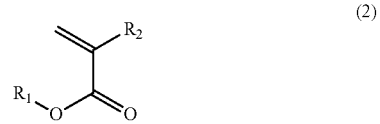
(2)

wherein $R_1$ represents a group having an azobenzene structure represented by Formula (3) below; n is an integer of 2 to 18; m is an integer of 0 to 16; and $R_2$ represents hydrogen or a methyl group.

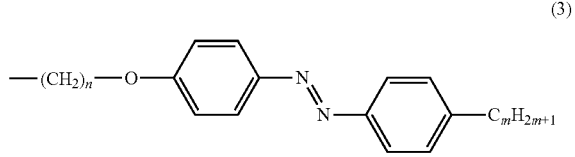
(3)

The photo-reactive adhesive agent according to the present invention (preferably a photo-reactive pressure-sensitive adhesive agent) is solid at room temperature, it lacks fluidity at the time of adhesion, it is fluidized with the application of light in a particular wavelength range and is deprived of the adhesion force, and the fluidized adhesive agent is irradiated with light in a different wavelength range to regain the adhesion force.

The main component of the adhesive agent according to the present invention, which is a polymeric compound represented by General Formula (1), comprises a polymeric liquid crystalline block A comprising a photo-reactive group that exhibits phase transition with the application of light and a block B that is light permeable and lacks photo-reactivity. Unlike conventional photo-regulated adhesive agents, accordingly, light easily enters deep inside the adhesive layer through the light permeable block B, and the photo-reactive reaction takes place within a shorter period of time. In addition, the light-permeable block B of the photo-reactive adhesive agent according to the present invention is a flexible unit, and it is excellent in terms of elasticity as a whole. Thus, it can easily form a film.

With the application of lights in different wavelength ranges, fluidity of the photo-reactive adhesive agent according to the present invention (preferably a photo-reactive pressure-sensitive adhesive agent) can be reversibly regulated. A unit constituting a block A of a polymeric compound represented by General Formula (1), which is a main component, has a photoisomerizable azobenzene structure in its side chain, it remains photoisomerizable even if the fluidity is lost, the molecular structure thereof is significantly changed due to the photoisomerization reaction in the absence of fluidity, the adhesive agent is softened and fluidized, and light of a different wavelength range is applied thereto again or the adhesive agent is merely allowed to stand. This causes a reverse reaction, and the adhesive agent is non-fluidized again. The photo-reactive adhesive agent according to the present invention is capable of repetition of such procedures.

The polymeric compound comprising a photo-reactive group according to the present invention is solid at around room temperature under general light. When it is used as an adhesive agent, accordingly, the compound is irradiated with ultraviolet light to liquefy, the liquefied compound is sandwiched between layers to be adhered to each other, and the compound is solidified with the application of visible light to allow the layers to be adhered to each other. Alternatively, the adhesive agent is molten with heating, the molten adhesive agent is sandwiched between layers to be adhered to each other, and it is then cooled to solidify. Thus, such layers can be adhered to each other. Further, the adhesive agent may be processed in the form of a sheet or tape in advance, the processed adhesive agent may then be sandwiched between two objects to be adhered to each other, and the adhesive agent may be liquefied and solidified in the manner described above. Thus, the two objects can be adhered to each other. Alternatively, the adhesive agent may be dissolved in a solvent, the liquefied adhesive agent may be applied to one surface of the objects, the adhesive agent may be dried, and the dried adhesive agent may then be liquefied and solidified. Thus, two objects can be adhered to each other.

When the adhesive agent is liquefied thermally, it is necessary that the adhesive agent be heated to a temperature equal to or higher than the melting point, the glass transition point, or the softening point (at least 80° C.) in accordance with a chemical structure of an adhesive agent.

When the adhesive agent is brought into contact with the objects before it is hardened, as described above, the adhesive agent is preferably liquid. The adhesive agent may be in a plastically deformable rubbery form. Specifically, it may not be necessary to soften the adhesive agent until it is fluidized. It is sufficient if the adhesive agent can be fluidized and brought into close contact with the object with the application of slight stress (i.e., an adhered state), the objects are brought into close contact with each other, and the adhesive agent may then be hardened. Thus, the objects can be adhered to each other. In such a case, a pressure to be applied is not particularly limited, and the adhesive agent may be pushed with a finger at an appropriate pressure (0.01 to 1.00 MPa).

Concerning conventional adhesive agents capable of reversible adhesion and peeling with the application of light (Patent Literature 2 and Non Patent Literature 1), when a thickness of the adhesive layer is of several microns and ultraviolet light of 20 to 40 m W/cm² is applied, it takes 3 minutes to liquefy the adhesive agent in practice.

Such phenomenon takes place for the following reasons. That is, an azo dye concentration is high in the adhesive layer, light does not penetrate deep into the adhesive layer, and fluidization caused by light application proceeds only from the surface.

A dye is diluted with a relatively flexible unit that does not absorb light, so as to overcome the drawback of conventional photo-reactive adhesive agents. Thus, light is allowed to penetrate deep into the adhesive layer, and photo-reactive sensitivity may be improved while photoreversibility is maintained.

It should be noted that the addition of a colorless non-photo-reactive additive is likely to induce phase separation and the adhesive layer is likely to peel at the time of adhesion.

In the present invention, accordingly, a colorless flexible component is separated from a unit causing photo-induced phase transition, leading to a phase shift, and the tri- to penta-block copolymers each comprising such component and unit chemically bound to each other indicated below was prepared.

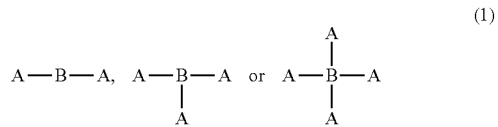

(1)

The polymeric compound represented by Formula (1) comprises photo-induced phase transition unit As that are solid at room temperature at both terminuses, and such units function as intermolecular crosslinking points. Thus, the polymeric compound functions as an adhesive agent with rubbery properties. With the application of ultraviolet light, in addition, the photo-induced phase transition reaction takes place only in the region of such units, and the entire area is liquefied as a consequence. Even if a thickness of the layer is increased, accordingly, photo-reaction can take place with high sensitivity.

It should be noted that polymer viscosity depends on the molecular weight. When such polymer is used as an adhesive agent, accordingly, a polymer with an average molecular weight within a preferable range may be used, and the weight average molecular weight is preferably 3,000 to 800,000 in terms of polystyrene standards.

The photo-reactive adhesive agent according to the present invention (preferably a photo-reactive pressure-sensitive adhesive agent) becomes capable of reversible photo-induced liquefaction and solidification with the application of light in a preferable wavelength range to the polymeric compound represented by General Formula (1), which is a main component of the adhesive agent. The polymeric compound represented by General Formula (1) is photo-isomerized when the azobenzene structure in the side chain of the unit constituting a block A responds to light applied thereto. When the azobenzene structure is in a trans form, the polymeric compound is non-fluidized. When the azobenzene structure is in a cis form, in contrast, the polymeric compound is fluidized.

In order to liquefy the adhesive agent according to the present invention, accordingly, isomerization of azobenzene from a trans form to a cis form is necessary. In order to improve isomerization efficiency, application of light in a wavelength range that is not absorbed by the cis form is necessary. When the ultraviolet light in a wavelength range of 300 to 400 nm, which is a major absorption region by the trans form, is applied, the adhesive agent according to the present invention can be peeled. For more efficient peeling, azobenzene is preferably isomerized from a trans form to a cis form with the application of ultraviolet light at around 350 to 390 nm, and more preferably with the application of ultraviolet light at around 365 nm. In order to adhere the objects to each other with the use of the adhesive agent according to the present invention, in contrast, azobenzene is preferably isomerized from a cis form to a trans form with the application of light at 420 to 600 nm, and more preferably with the application of visible light at around 500 nm.

An optimal wavelength of light to be applied to the photo-reactive adhesive agent varies depending on the molecular structure in the vicinity of the azobenzene structure. In the case of a material used in the present examples, light in a wavelength range of 360 to 380 nm is preferable. Such material may be irradiated with light at around 500 nm, which is less likely to be absorbed by a trans form. Thus, the cis form can be converted into the trans form immediately.

The objects to be adhered to each other with the use of the photo-reactive adhesive agent according to the present invention are not necessarily colorless; however, it is necessary that ultraviolet light in the wavelength range described above and a part of visible light are transmitted from at least one of the objects to the surfaces to be adhered to each other. Examples thereof include glass, PET, polycarbonate, and polystyrene boards. The other object may not be light-permeable. Examples thereof include aluminum, iron, colored glass, and ceramics.

When the adhesive agent is brought into contact with the objects before it is hardened, the adhesive agent is preferably liquid. As described above, a rubbery adhesive agent that is plastically deformable may be fluidized and adhered to the objects with the application of small stress, and it may then be hardened. Thus, the objects can be adhered to each other. In such a case, a pressure to be applied is not particularly limited, and the adhesive agent may be pushed with a finger at an appropriate pressure (0.01 to 1.00 MPa).

A photo-reactive block A of the polymeric compound represented by General Formula (1), which is a main component of the adhesive agent according to the present invention, has a polymeric structure comprising monomers each having an azobenzene structure in the side chain. When azobenzene is in a trans form, the glass transition point and the melting point of the homopolymer are room temperature (25° C.) or higher, and preferably 40° C. or higher.

A transparent and flexible block B of the polymeric compound represented by General Formula (1), which is a main component of the adhesive agent according to the present invention, is required to be in a liquid or plastically deformable rubbery form at room temperature (25° C.). To this end, the glass transition point and the melting point are preferably 10° C. or lower. Since the dye concentration of the adhesive agent is to be lowered, the polymer structure is not an issue of concern, and any liquid or plastically deformable rubbery polymer that is colorless and does not absorb light may be used. The term "colorless" used herein refers to the condition under which a photoreaction of a dye is not inhibited. Specifically, light in the wavelength range of 350 to 600 nm is not absorbed or is not substantially absorbed.

From the viewpoint of ease of polymer synthesis, in practice, the structure of the block B is limited to several patterns.

As methods for block copolymer synthesis, anionic polymerization, cationic polymerization, and living radical polymerization are known. Among such methods, living radical polymerization, such as ATRP or RAFT, is known as a convenient method of synthesis. According to such method of synthesis, vinyl-based monomers may be used.

In particular, many polymers of acrylic monomers that are liquid at room temperature are known. An example thereof is a polymer of monomers represented by Formula (4) below. As polymers other than acrylic polymers, a styrene-based polymer with low Tg, such as a polymer represented by Formula (5), is known:

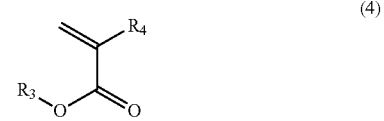

wherein $R_3$ represents $-C_lH_{2l+1}$, $-C_lH_{2l}-Si(OSi(CH_3)_3)_3$, or $-C_lH_{2l}OH$; $R_4$ represents hydrogen or a methyl group; and l is an integer of 1 to 18 when $R_4$ represents hydrogen and an integer of 4 to 18 when $R_4$ represents a methyl group:

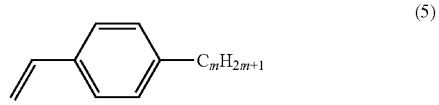

wherein m is an integer of 4 to 18.

Block structures can be synthesized by, for example, the atom transfer radical polymerization (ATRP) method (Matyjaszewski, K., Macromolecules 2012, 45, 4015-4039, many other documents are omitted). In such method, a bifunctional (Formula (6)), a trifunctional (Formula (7)), and a tetrafunctional (Formula (8)) compounds shown below are used as initiators, and monomers represented by Formula (4) are polymerized in the presence of a copper catalyst.

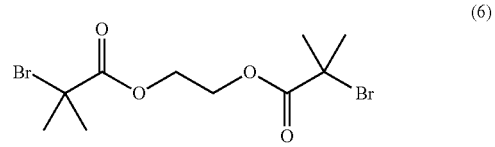

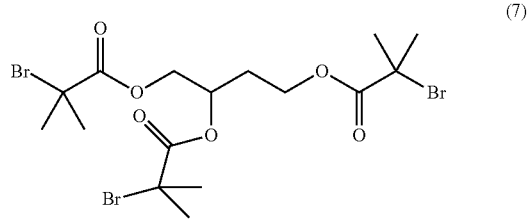

(8)

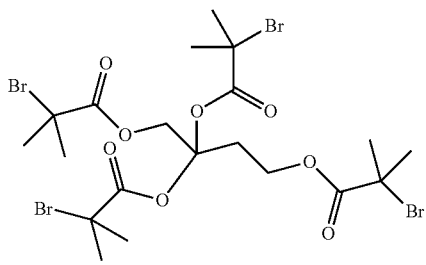

Subsequently, a polymer obtained by the reaction shown above (Formula (9): an example of polymerization of a bifunctional initiator and 2-ethylhexyl acrylate) is isolated, and, as a polymeric initiator, the azobenzene-containing monomers represented by Formula (2) are polymerized again in the presence of a copper catalyst. When substantially all the monomers are consumed in the first phase, alternatively, monomers represented by Formula (2) may be added, and polymerization may be continued without isolating the resulting polymer. Thus, the target block copolymer can be obtained (Formula (10): an example of polymerization of 10-[4-(4-hexylphenylazo)phenoxy]decyl acrylate).

(9)

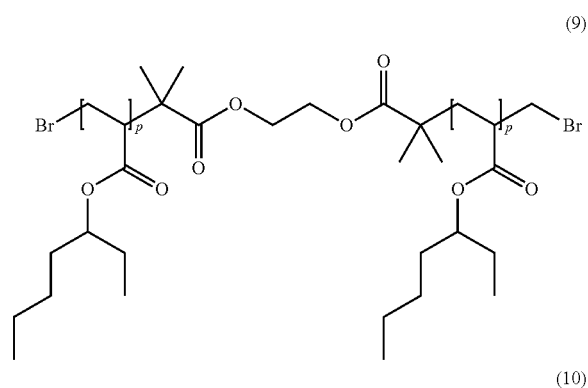

(10)

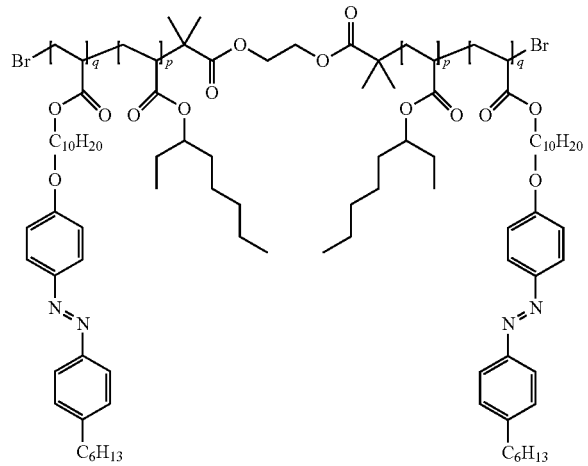

The present invention also encompasses a method of adhesion and peeling via reversible non-fluidization and fluidization with the application of lights in different wavelength ranges with the use of the photo-reactive adhesive agent (preferably a photo-reactive pressure-sensitive adhesive agent). According to the method of adhesion and peeling of the present invention, preferably, the adhesive agent is fluidized and peeled with the application of light, in particular, with the application of ultraviolet light in the wavelength range of 350 to 390 nm at the light exposure dose of 0.05 to 10 J/cm$^2$. According to the method of adhesion and peeling of the present invention, preferably, the adhesive agent is non-fluidized with the application of light in a wavelength range different from that of the light used for fluidization, more specifically, with the application of light in the wavelength range of 420 to 600 nm to adhere objects to each other. According to the method of adhesion and peeling of the present invention, the adhesive agent can repeat adhesion and peeling via reversible non-fluidization and fluidization with the application of lights in different wavelength ranges.

EXAMPLES

Hereafter, the present invention is described in greater detail with reference to the examples, although the technical scope of the present invention is not limited to these examples.

Abbreviations used in the examples are as follows.

EBBiB: Ethylene bis(2-bromoisobutyrate) (Compound represented by Formula (6))

4SPA: (3-Acryloxypropyl)tris(trimethylsiloxy)silane (Compound represented by Formula (4): wherein $R_3$ represents —$C_3H_6$—Si(OSi(CH$_3$)$_3$)$_3$; and $R_4$ represents H)

6Az10Ac: 10-(4-(4-Hexylphenylazo)phenoxy)decyl acrylate (Compound represented by Formula (2): wherein $R_1$ represents a group represented by Formula (3) wherein m is 6; n is 10; and $R_2$ represents H)

Bpy6: 4,4'-Dinonyl-2,2'-bipyridyl (Compound represented by Formula (11))

ConvNMR: Monomer conversion rate estimated based on NMR

MwNMR: Molecular weight of polymer calculated based on ConvNMR

EHA: 2-Ethylhexyl acrylate (Compound represented by Formula (4): wherein $R_3$ represents -3-$C_8H_{17}$ (i.e., l=2); and $R_4$ represents H)

Me6TREN: Tris[2-(dimethylamino)ethyl]amine (Compound represented by Formula (12))

(11)

(12)

(Example 1) Synthesis of ABA Triblock Polymer [poly(6Az10Ac)-b-poly(4SPA)-b-poly(6Az10Ac)]

(1a) Synthesis of poly(4SPA)-1

A stirrer was introduced into a pressure-resistant tubing, and 25 mg (0.069 mmol) of EBBiB, 9.6 mg (0.069 mmol)

of CuBr, 54.6 mg (0.138 mmol) of bpy9, and 4.2 mg (0.069 mmol) of Cu were added thereto. In an aseptic bag under a nitrogen atmosphere, 0.67 ml of tetrahydrofuran (THF) was added thereto, the mixture was stirred until all the components formed a homogenous solution, 0.62 ml (1.38 mmol) of 4SPA was added thereto, and the bag was hermetically sealed, followed by heating in an oil bath at 55° C. for 6 hours with stirring. Thereafter, the resultant was cooled in a refrigerator for 15 minutes, CuBr2 was added thereto, the components were moderately mixed with each other, and the mixture was allowed to pass through a column containing neutral alumina powder. The content of the column was re-precipitated with methanol, centrifuged, and then purified. The yield was 413 mg, ConvNMR was 93%, and MwNMR was 7,588 gmol$^{-1}$.

(1b) Synthesis of [poly(6Az10Ac)-b-poly(4SPA)-b-poly(6Az10Ac)]-1

A stirrer was introduced into a pressure-resistant tubing, and 250 mg (0.033 mmol) of poly(4SPA)-1, 19 mg (0.13 mmol) of CuBr, 108 mg (0.26 mmol) of bpy9, 16.8 mg (0.26 mmol) of Cu, and 305 mg (0.66 mmol) of 6Az10Ac were added thereto. In an aseptic bag under an Ar atmosphere, 0.66 ml of THF was added thereto, the mixture was stirred until all the components formed a homogenous solution while heating the mixture with hot water, and the bag was hermetically sealed, followed by heating in an oil bath at 55° C. for 24 hours with stirring. Thereafter, the resultant was allowed to pass through a column containing neutral alumina powder and then purified through a silica column. The yield was 250 mg, ConvNMR was 68%, and MwNMR was 13,880 gmol$^{-1}$.

(2a) Synthesis of poly(4SPA)-2

A stirrer was introduced into a pressure-resistant tubing, and 18 mg (0.05 mmol) of EBBiB, 7.2 mg (0.05 mmol) of CuBr, 41 mg (0.10 mmol) of bpy9, and 3.2 mg (0.05 mmol) of Cu were added thereto. In an aseptic bag under a nitrogen atmosphere, 0.3 ml of THF was added thereto, the mixture was stirred until all the components formed a homogenous solution, 0.28 ml (0.61 mmol) of 4SPA was added thereto, and the bag was hermetically sealed, followed by heating in an oil bath at 55° C. for 6 hours with stirring. Thereafter, the resultant was cooled in a refrigerator for 15 minutes, CuBr2 was added thereto, the components were moderately mixed with each other, and the mixture was allowed to pass through a column containing neutral alumina powder. The content of the column was re-precipitated with methanol, centrifuged, and then purified. The yield was 64 mg, ConvNMR was 100%, and MwNMR was 4,896 gmol$^{-1}$.

(2b) Synthesis of [poly(6Az10Ac)-b-poly(4SPA)-b-poly(6Az10Ac)]-2

A stirrer was introduced into a pressure-resistant tubing, and 64 mg (0.013 mmol) of poly(4SPA)-2, 7.5 mg (0.052 mmol) of CuBr, 43 mg (0.10 mmol) of bpy9, 6.7 mg (0.10 mmol) of Cu, and 121 mg (0.26 mmol) of 6Az10Ac were added thereto. In an aseptic bag under an Ar atmosphere, 0.26 ml of THF was added thereto, the mixture was stirred until all the components formed a homogenous solution while heating the mixture with hot water, and the bag was hermetically sealed, followed by heating in an oil bath at 55° C. for 24 hours with stirring. Thereafter, the resultant was allowed to pass through a column containing neutral alumina powder and then purified through a silica column. The yield was 32 mg, ConvNMR was 60%, and MwNMR was 10,448 gmol$^{-1}$.

(3a) Synthesis of poly(4SPA)-3

A stirrer was introduced into a pressure-resistant tubing, and 6.3 mg (0.017 mmol) of EBBiB, 2.4 mg (0.017 mmol) of CuBr, 14 mg (0.034 mmol) of bpy9, and 1.1 mg (0.017 mmol) of Cu were added thereto. In an aseptic bag under a nitrogen atmosphere, 0.3 ml of THF was added thereto, the mixture was stirred until all the components formed a homogenous solution, 0.28 ml (0.61 mmol) of 4SPA was added thereto, and the bag was hermetically sealed, followed by heating in an oil bath at 55° C. for 6 hours with stirring. Thereafter, the resultant was cooled in a refrigerator for 15 minutes, CuBr2 was added thereto, the components were moderately mixed with each other, and the mixture was allowed to pass through a column containing neutral alumina powder. The content of the column was re-precipitated with methanol, centrifuged, and then purified. The yield was 111 mg, ConvNMR was 100%, and MwNMR was 14,280 gmol$^{-1}$.

(3b) Synthesis of [poly(6Az10Ac)-b-poly(4SPA)-b-poly(6Az10Ac)]-3

A stirrer was introduced into a pressure-resistant tubing, and 111 mg (0.0078 mmol) of poly(4SPA)-3, 7.5 mg (0.031 mmol) of CuBr, 25 mg (0.062 mmol) of bpy9, 4.0 mg (0.062 mmol) of Cu, and 72 mg (0.15 mmol) of 6Az10Ac were added thereto. In an aseptic bag under an Ar atmosphere, 0.15 ml of THF was added thereto, the mixture was stirred until all the components formed a homogenous solution while heating the mixture with hot water, and the bag was hermetically sealed, followed by heating in an oil bath at 55° C. for 24 hours with stirring. Thereafter, the resultant was allowed to pass through a column containing neutral alumina powder and then purified through a silica column. The yield was 43 mg, ConvNMR was 86%, and MwNMR was 22,237 gmol$^{-1}$.

(4a) Synthesis of poly(4SPA)-4

A stirrer was introduced into a pressure-resistant tubing, and 4.9 mg (0.013 mmol) of EBBiB, 1.9 mg (0.013 mmol) of CuBr, 11 mg (0.026 mmol) of bpy9, and 0.83 mg (0.013 mmol) of Cu were added thereto. In an aseptic bag under a nitrogen atmosphere, 0.3 ml of THF was added thereto, the mixture was stirred until all the components formed a homogenous solution, 0.28 ml (0.61 mmol) of 4SPA was added thereto, and the bag was hermetically sealed, followed by heating in an oil bath at 55° C. for 6 hours with stirring. Thereafter, the resultant was cooled in a refrigerator for 15 minutes, CuBr2 was added thereto, the components were moderately mixed with each other, and the mixture was allowed to pass through a column containing neutral alumina powder. The content of the column was re-precipitated with methanol, centrifuged, and then purified. The yield was 154 mg, ConvNMR was 100%, and MwNMR was 18,360 gmol$^{-1}$.

(4b) Synthesis of [poly(6Az10Ac)-b-poly(4SPA)-b-poly(6Az10Ac)]-4

A stirrer was introduced into a pressure-resistant tubing, and 154 mg (0.0084 mmol) of poly(4SPA)-4, 4.8 mg (0.034 mmol) of CuBr, 27 mg (0.068 mmol) of bpy9, 4.3 mg (0.068 mmol) of Cu, and 77 mg (0.17 mmol) of 6Az10Ac were added. In an aseptic bag under an Ar atmosphere, 0.17 ml of THF was added thereto, the mixture was stirred until all the components formed a homogenous solution while heating the mixture with hot water, and the bag was hermetically sealed, followed by heating in an oil bath at 55° C. for 24 hours with stirring. Thereafter, the resultant was allowed to pass through a column containing neutral alumina powder and then purified through a silica column. The yield was 37 mg, ConvNMR was 56%, and MwNMR was 23,541 gmol$^{-1}$.

(Example 2) Synthesis of ABA Triblock Polymer [poly(6Az10Ac)-b-poly(EHA)-b-poly(6Az10Ac)]

(1a) Synthesis of poly(EHA)-1

A stirrer was introduced into a pressure-resistant tubing, and 11.6 mg (0.032 mmol) of EBBiB, 4.6 mg (0.032 mmol) of CuBr, 26.1 mg (0.064 mmol) of bpy9, and 2.0 mg (0.032 mmol) of Cu were added thereto. In an aseptic bag under a nitrogen atmosphere, 0.67 ml of THF was added thereto, the mixture was stirred until all the components formed a homogenous solution, 0.30 ml (1.44 mmol) of EHA was added thereto, and the bag was hermetically sealed, followed by heating in an oil bath at 55° C. for 8 hours with stirring. Thereafter, the resultant was cooled in a refrigerator for 15 minutes, CuBr2 was added thereto, the components were moderately mixed with each other, and the mixture was allowed to pass through a column containing neutral alumina powder. The content of the column was re-precipitated with methanol, centrifuged, and then purified. The yield was 162 mg, ConvNMR was 71%, and MwNMR was 5,878 gmol$^{-1}$.

(1b) Synthesis of [poly(6Az10Ac)-b-poly(EHA)-b-poly(6Az10Ac)]-1

A stirrer was introduced into a pressure-resistant tubing, and 162 mg (0.028 mmol) of poly(EHA)-1, 15.8 mg (0.11 mmol) of CuBr, 89.8 mg (0.22 mmol) of bpy9, 14.0 mg (0.22 mmol) of Cu, and 255 mg (0.55 mmol) of 6Az10Ac were added. In an aseptic bag under an Ar atmosphere, 0.55 ml of THF was added thereto, the mixture was stirred until all the components formed a homogenous solution while heating the mixture with hot water, and the bag was hermetically sealed, followed by heating in an oil bath at 55° C. for 24 hours with stirring. Thereafter, the resultant was allowed to pass through a column containing neutral alumina powder and then purified through a silica column. The yield was 60 mg, ConvNMR was 68%, and MwNMR was 12,170 gmol$^{-1}$.

(2a) Synthesis of poly(EHA)-2

A stirrer was introduced into a pressure-resistant tubing, and 5.8 mg (0.016 mmol) of EBBiB, 2.2 mg (0.0099 mmol) of CuBr2, 2.7 ul (0.0099 mmol) of Me6TREN, and 16.9 mg (0.20 mmol) of ascorbic acid were added. In an aseptic bag under an Ar atmosphere, 0.29 ml of toluene was added thereto, the mixture was stirred until all the components formed a homogenous solution, 0.30 ml (0.14 mmol) of EHA was added thereto, and the bag was hermetically sealed, followed by heating in an oil bath at 55° C. for 4 hours with stirring. Thereafter, the resultant was cooled in a refrigerator for 15 minutes, and the resultant was allowed to pass through a column containing neutral alumina powder. The content of the column was re-precipitated with methanol, centrifuged, and then purified. The yield was 131 mg, ConvNMR was 94%, and MwNMR was 15,566 gmol$^{-1}$.

(2b) Synthesis of [poly(6Az10Ac)-b-poly(EHA)-b-poly(6Az10Ac)]-2

A stirrer was introduced into a pressure-resistant tubing, and 131 mg (0.0084 mmol) of poly(EHA)-2, 1.87 mg (0.0084 mmol) of CuBr2, 2.4 ul (0.0084 mmol) of Me6TREN, 14.8 mg (0.084 mmol) of ascorbic acid, and 136 mg (0.29 mmol) of 6Az10Ac were added. In an aseptic bag under an Ar atmosphere, 0.20 ml of toluene was added thereto, the mixture was stirred until all the components formed a homogenous solution while heating the mixture with hot water, and the bag was hermetically sealed, followed by heating in an oil bath at 55° C. for 24 hours with stirring. Thereafter, the resultant was allowed to pass through a column containing neutral alumina powder, the content of the column was re-precipitated with a solvent mixture of methanol and acetone (1:2), centrifuged, and then purified. The yield was 100 mg, ConvNMR was 47%, and MwNMR was 23,166 gmol$^{-1}$.

(Example 3) Liquefaction Test of poly[(6Az10Ac)-b-(4SPA)-b-(6Az10Ac)]-1 with UV Application (1)

A very small amount of poly[(6Az10Ac)-b-(4SPA)-b-(6Az10Ac)]-1 was mounted on glass slide substrates (Matsunami white cut-off No. 1), and ultraviolet light with a center wavelength of 365 nm (half value width: 13 nm) was applied thereto at room temperature (about 25° C.) using an LED source (LC-L1V3, Hamamatsu Photonics K.K.). As a result of the light application for 0.5 minutes (3 J/cm$^2$), the powder was converted into a starch-syrup-like viscous liquid. This rate of liquefaction was two times faster than that of conventional sugar alcohol ester materials (Patent Literature 2).

(Example 4) Liquefaction Test of poly[(6Az10Ac)-b-(4SPA)-b-(6Az10Ac)]-1 with UV Application (2)

Poly[(6Az10Ac)-b-(4SPA)-b-(6Az10Ac)]-1 (about 1 mg), which was not irradiated with light, was sandwiched between 2 glass substrates in a molten state with heating, and it was spread in an area of 15 mm×15 mm. The glass substrates were adhered to each other via cooling. The glass substrates were irradiated with ultraviolet light with a center wavelength of 365 nm at room temperature (about 25° C.) using an LED source (LC-L1V3, Hamamatsu Photonics K.K.) (3 J/cm$^2$) for liquefaction. As a result, two glass substrates were detached from each other with fingers.

(Example 5) Adhesion TEST of poly[(6Az10Ac)-b-(4SPA)-b-(6Az10Ac)]-1 with Visible Light Application The two glass substrates holding the sample liquefied with the application of ultraviolet light sandwiched therebetween were irradiated with visible light with a center wavelength of 510 nm using an LED source (Luxeon cyan 5w LXHL-LESC) for 3 minutes (6 J/cm$^2$). As a result, the surfaces adhered to each other remained transparent, but the two substrates were not detached from each other with fingers. While these two substrates were each pulled toward opposite directions, the substrates were not detached from each other.

(Example 6) Liquefaction and Adhesion Test of Other Triblock Polymers According to the Present Invention The results attained for triblock polymers ([poly (6Az10Ac)-b-poly(4SPA)-b-poly(6Az10Ac)]-2 to 4 and [poly(6Az10Ac)-b-poly(EHA)-b-poly(6Az10Ac)]-1 and 2) other than Poly[(6Az10Ac)-b-(4SPA)-b-(6Az10Ac)]-1 obtained in Examples 1 and 2 were the same as those attained in Examples 3 to 5.

(Comparative Example 1) Synthesis of AB Diblock Polymer: EBiB-PEHA-b-P6Az10Ac-Br (a) Polymerization of EBiB-PEHA-Br A stirrer was introduced into a pressure-resistant tubing, and 4.0 ul (0.027 mmol) of ethyl 2-bromoisobutyrate (EBiB), 1.8 mg (0.0081 mmol) of CuBr2, 2.2 ul (0.0081 mmol) of Me6TREN, and 29 mg (0.16 mmol) of ascorbic acid were added. In an aseptic bag under an Ar atmosphere, 0.48 ml of toluene was added thereto, the mixture was stirred until all the components formed a homogenous solution, 0.50 ml (2.4 mmol) of EHA was added, and the bag was hermetically sealed, followed by heating in an oil bath at 55° C. for 5 hours with stirring. Thereafter, the resultant was cooled in a refrigerator for 15 minutes and the resultant was allowed to pass through a column containing neutral alumina powder. The content of the column was re-precipitated with methanol, centrifuged, and then purified. The yield was 200 mg, ConvNMR was 96%, and MwNMR was 15,897 gmol$^{-1}$.

(b) Polymerization of Diblock Polymer (poly[(6Az10Ac)-b-(EHA)])

A stirrer was introduced into a pressure-resistant tubing, and 200 mg (0.013 mmol) of EBiB-PEHA-Br, 2.8 mg (0.013 mmol) of CuBr2, 3.5 ul (0.013 mmol) of Me6TREN, 22 mg (0.13 mmol) of ascorbic acid, and 0.12 g (2.5 mmol) of 6Az10Ac were added. In an aseptic bag under an Ar atmosphere, 0.17 ml of toluene was added thereto, the mixture was stirred until all the components formed a homogenous solution while heating the mixture with hot water, and the bag was hermetically sealed, followed by heating in an oil bath at 55° C. for 24 hours with stirring. Thereafter, the content of the column was re-precipitated (methanol:acetone=1:2), centrifuged, and then purified. The yield was 130 mg, ConvNMR was 61%, and MwNMR was 21,541 gmol$^{-1}$.

(Comparative Example 2) Synthesis of Random Copolymer: poly(EHA-co-6Az10Ac)

A stirrer was introduced into a pressure-resistant tubing, and 6.6 mg (0.040 mmol) of azobisisobutyronitrile and 185 mg (0.40 mmol) of 6Az10Ac were added thereto. In an aseptic bag under an Ar atmosphere, 0.50 ml of toluene was added thereto, the mixture was stirred until all the components formed a homogenous solution, 0.33 ml (1.6 mmol) of EHA was added thereto, and the bag was hermetically sealed, followed by heating in an oil bath at 80° C. for 1 hour with stirring. The resultant was subjected to re-precipitation with methanol and centrifugation to obtain 180 mg of a liquid polymer. ConvNMR (EHA) was 52%, ConvNMR (6Az10Ac) was 60%, MwGPC was 53790 gmol$^{-1}$, and MWD was 2.22.

Figure 2:
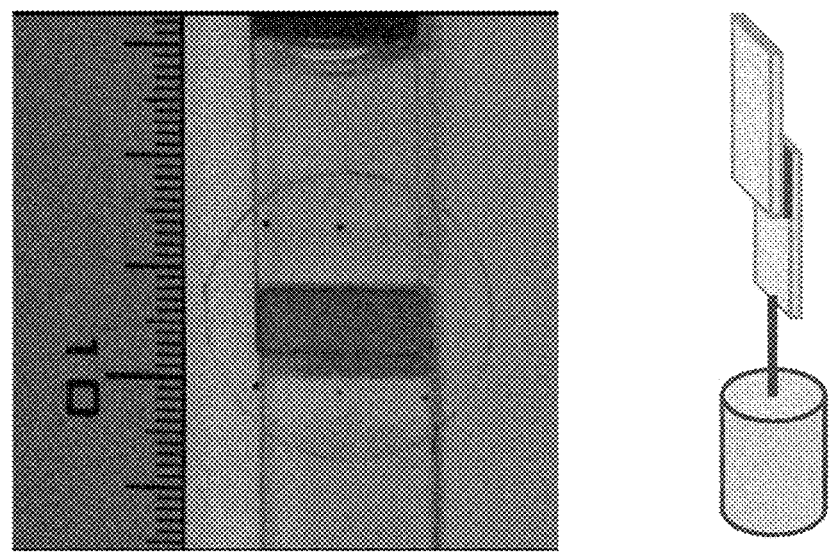
FIG. 2 shows an adhesion strength test with the use of a material that is liquefied and solidified with the application of light.

(Example 7) Tests of Melt Adhesion of the Triblock Polymer of the Present Invention and the Diblock Polymer of Comparative Example 1, Liquefaction With Application of Ultraviolet Light, and Adhesion With Application of Visible Light Two glass substrates (1.5 cm×5 cm×3 mm) were superposed on top of each other by a width of 1.5 cm, the synthesized polymer (a little less than 10 mg) was molten and sandwiched therebetween, the temperature was returned to room temperature to adhere the substrates to obtain the sample, the resultant was irradiated with ultraviolet light at 365 nm (LC-L1V3, Hamamatsu Photonics K.K.) for 2 or 3 minutes to obtain the sample, and visible light of 510 nm (Luxeon cyan 5w LXHL-LESC) was applied thereto for 10 to 15 minutes to obtain the sample. The resulting 5 samples for each sample were subjected to the tensile strength test to determine the tensile shear bond strength, and the average of the 5 samples was designated as the adhesion strength (FIG. 2). Table 1 shows the summarized results.

TABLE 1

| | Adhesion strength/MPa | | |
|---|---|---|---|
| Polymer | Melt adhesion | UV application | Visible light application |
| Poly[(6Az10Ac)-b-(4SPA)-b-(6Az10Ac)]-1 | 0.29 ± 0.07 | 0.02 | 0.48 ± 0.06 |
| [poly(6Az10Ac)-b-poly(EHA)-b-poly(6Az10Ac)]-1 | 0.06 ± 0.03 | 0.00 | 0.31 ± 0.09 |
| [poly(6Az10Ac)-b-poly(EHA)-b-poly(6Az10Ac)]-2 | 0.10 ± 0.04 | 0.00 | 0.22 ± 0.02 |
| [poly(6Az10Ac)-b-poly(EHA)] | 0.01 ± 0.01 | 0.01 | 0.05 ± 0.03 |

All publications, patents, and patent applications cited herein are incorporated herein by reference in their entirety.

The invention claimed is:
1. A photo-reactive pressure-sensitive adhesive agent comprising, as a main component, a polymeric compound with a weight average molecular weight of 3,000 to 800,000 represented by General Formula (1):

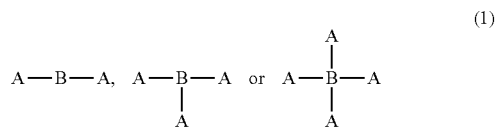

wherein A represents a block polymer of monomers represented by Formula (2) below with a molecular weight of 1,000 to 100,000; and B represents a block polymer with a molecular weight of 1,000 to 400,000 having a glass transition point and a melting point of 20° C. or lower, which is liquid or plastically deformable at room temperature, wherein B does not absorb light of a wavelength range of 350 to 600 nm:

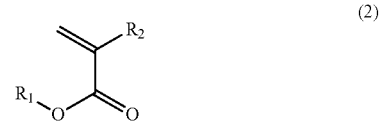

wherein $R_1$ represents a group having an azobenzene structure represented by Formula (3) below; n is an integer of 2 to 18; m is an integer of 0 to 16; and $R_2$ represents hydrogen or a methyl group.

(3)

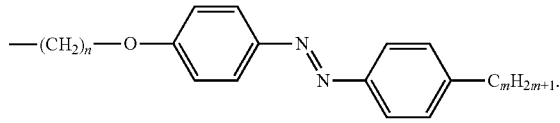

2. The photo-reactive pressure-sensitive adhesive agent according to claim 1, which can be fluidized and peeled from an object to which it is adhered with an application of light.

3. The photo-reactive pressure-sensitive adhesive agent according to claim 2, which can be fluidized and peeled from the object to which it is adhered with an application of ultraviolet light in a wavelength range of 350 to 390 nm at a light exposure dose of 0.05 to 10 J/cm².

4. The photo-reactive pressure-sensitive adhesive agent according to claim 1, which can be non-fluidized with an application of light in a wavelength range different from that of light used for fluidization to adhere objects to each other.

5. The photo-reactive pressure-sensitive adhesive agent according to claim 4, which can be non-fluidized with an application of light in a wavelength range of 420 to 600 nm.

6. The photo-reactive pressure-sensitive adhesive agent according to claim 1, which can be repeatedly adhered to and peeled from an object via reversible non-fluidization and fluidization with applications of light in different wavelength ranges.

7. A method of adhering the photo-reactive pressure-sensitive adhesive agent according to claim 1 to an object and peeling the adhesive agent from the object comprising: reversible non-fluidization and fluidization with applications of light in different wavelength ranges.

8. The method according to claim 7, wherein the adhesive agent is fluidized with an application of ultraviolet light in a wavelength range of 350 to 390 nm at a light exposure dose of 0.05 to 10 J/cm².

9. The method according to claim 7, wherein the adhesive agent is non-fluidized with an application of light in a wavelength range of 420 to 600 nm.

10. The method according to claim 7, wherein the adhesive agent can be repeatedly adhered to and peeled from the object via reversible non-fluidization and fluidization with applications of light in different wavelength ranges.

* * * * *